United States Patent
Newstead

[15] 3,682,281
[45] Aug. 8, 1972

[54] VEHICLE WHEEL BRAKES
[72] Inventor: Charles Newstead, Kings Road, Tyseley, Birmingham 11, England
[22] Filed: Sept. 3, 1970
[21] Appl. No.: 69,321

[30] Foreign Application Priority Data
Sept. 3, 1969 Great Britain..........43,646/69

[52] U.S. Cl............. 188/265, 92/2, 92/136, 192/3 H
[51] Int. Cl...............................................F16d 63/00
[58] Field of Search .188/265, 347; 192/3 H; 303/89; 92/2, 136

[56] References Cited
UNITED STATES PATENTS

| | | | |
|---|---|---|---|
| 280,668 | 7/1883 | Rawlins | 92/2 |
| 2,121,366 | 6/1938 | Robinson | 303/89 |
| 3,030,935 | 4/1962 | Hanes | 92/2 |

FOREIGN PATENTS OR APPLICATIONS 1,162,215  1/1964  Germany..................188/265

*Primary Examiner*—George E. A. Halvosa
*Attorney*—Scrivener, Parker, Scrivener and Clarke

[57] ABSTRACT

A fluid pressure slave cylinder for an internal shoe drum brake has mechanical locking means selectively operable to hold the brake shoes applied for parking purposes, the locking means including an axially movable strut member and a radially movable locking element which is moved into and out of locking engagement with the strut by a fluid pressure motor acting through a mechanical linkage. The linkage is preferably adapted to take up lost motion in the axial direction of movement of the strut, so as to retain a high braking load in the "locked" condition of the brake.

6 Claims, 5 Drawing Figures

VEHICLE WHEEL BRAKES

This invention relates to vehicle wheel brakes and provides a new and improved form of fluid pressure slave cylinder incorporating a mechanical locking means for holding the wheel brakes locked on for parking purposes.

In accordance with the present invention there is provided, an internal shoe drum brake having a pair of opposed brake shoes and a brake drum, a fluid pressure slave cylinder for applying the brake shoes to the drum, the slave cylinder including mechanical locking means for holding the shoe applied to the drum, wherein the mechanical locking means comprises a strut member mounted for axial movement relative to the body of the cylinder, a locking member mounted in the cylinder body for movement into and out of locking engagement with the strut member and a mechanical linkage actuated by an auxiliary fluid pressure motor for controlling engagement and disengagement of the locking member with the strut member.

Preferably, the strut member is of generally cylindrical form and has an external helical screw thread, the said locking member, which moves radially relative to the cylinder body and strut member, having a partial screw thread formation for engagement in the helical thread to lock the strut member against axial movement. The strut member is preferably rotatable relative to the cylinder body, and is automatically partially rotated to ensure proper engagement of the locking member with the helical thread.

The auxiliary motor may take the form of a simple fluid pressure operated piston and cylinder motor having its line of action at right angles to, but offset from the axis of rotation of the strut member, the piston having a piston rod arranged to engage and rotate the strut member to permit the locking member to move into engagement with the strut member. For this purpose, the piston rod is preferably formed with rack teeth for engagement with pinion teeth formed in the periphery of the strut member.

The slave cylinder may also include resilient load limiting means for transmitting thrust from a brake shoe back to the strut member.

The slave cylinder is preferably adapted for mounting directly between adjacent ends of both shoes of the drum brake, the cylinder body having connecting means for coupling to one shoe, and the piston being arranged to transmit thrust to a connecting means for the other shoe.

A presently preferred form of slave cylinder in accordance with the invention will now be described, by way of example only, with reference to the accompanying drawings in which.

Figure 1:
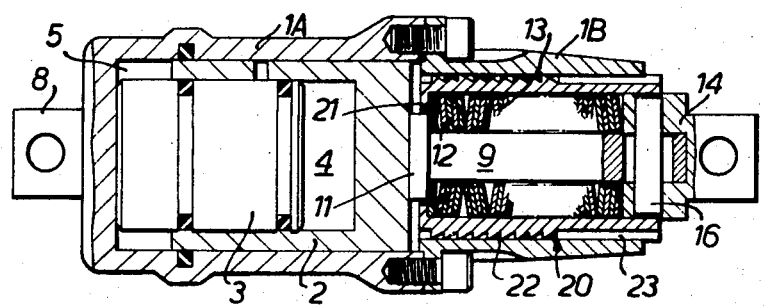
FIG. 1 is an axial cross-section of the slave cylinder.
Figure 2:
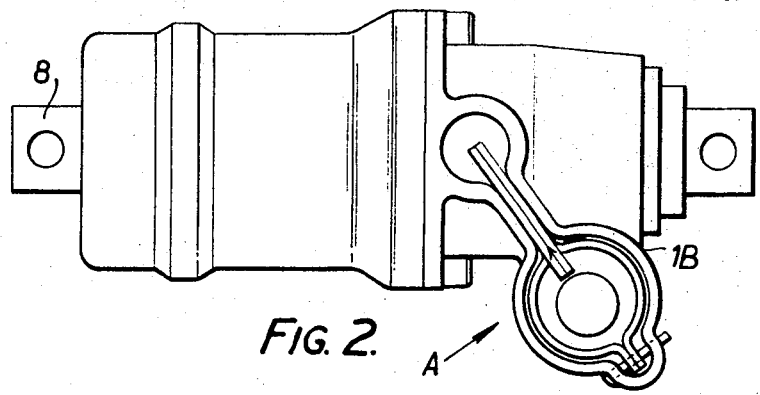
FIG. 2 is a plan view with a cover plate omitted for clarity.
Figure 3:
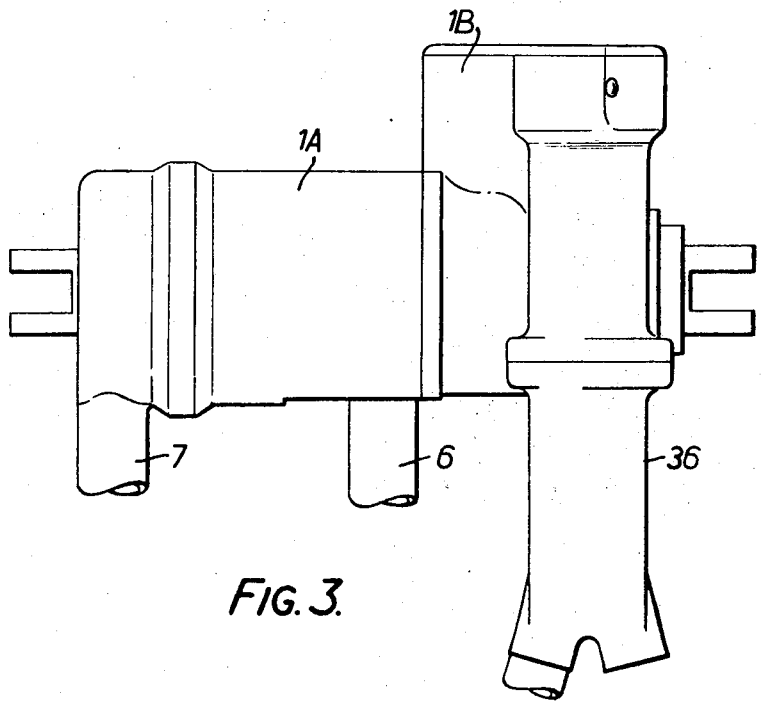
FIG. 3 is a side elevation of the slave cylinder.

The slave cylinder shown in the drawings comprises a cylinder body, made in two parts 1A and 1B, housing a hollow outer piston 2 and a solid inner piston 3, the cylinder and piston defining separate working chambers 4 and 5 having individual inlets 6 and 7, so that the chambers can be pressurized from separate hydraulic braking systems. Both chambers will normally be pressurized during service braking, but if one system fails the brake can still be applied by the other. The cylinder body is formed at its left hand end with a fork 8 for direct connection to one shoe of an internal shoe drum brake. At its right hand face, the outer piston 2 bears against a separate push rod 9 having a head 11 acting through a washer 12 on a stack of conically dished spring washers (i.e., Belleville Washers) 13, arranged in groups of say four washers, with alternate groups reversed with respect to their conicity. The right hand end of the stack of spring washers engages a fork end shackle 14 for connection to the second shoe of the drum brake. This shackle has a cross-pin 16 which passes through an axially extended hole in the push rod 9. Thus, hydraulic thrust is transmitted from the piston 2 to the shackle 14 through the intermediary of the spring washers, which are pre-loaded so as to act as a solid strut until a predetermined actuating force is applied to them, whereafter they deflect in accordance with their spring rate.

The mechanical locking means for holding the brake applied for parking comprises a generally cylindrical strut member 20, which forms a housing for the resilient means 13, having at its left hand end an internal peripheral flange 21 engaging over the washer 12. The member 20 is mounted co-axially with the pistons 2, 3, for axial and rotary movement relative to the cylinder body 1, so that it is normally free to follow up axial movements of the piston 2 relative to the cylinder 1. The left hand portion of the member 20 is formed with a helical buttress-type thread 22 and the right hand portion with axially extending pinion teeth 23. Co-operating with the thread 22 is a locking member in the form of a plunger 24 mounted in a bore in the cylinder body part 1B and biased by a plunger spring (not shown) into engagement with the thread 22. The inner end of the plunger is formed with partial screw threads (24A) to mate with the helical thread 22. Engagement and disengagement of the locking member 24 with the thread 22 is controlled by an auxiliary piston 27 through the intermediary of a lever 28.

Figure 4:
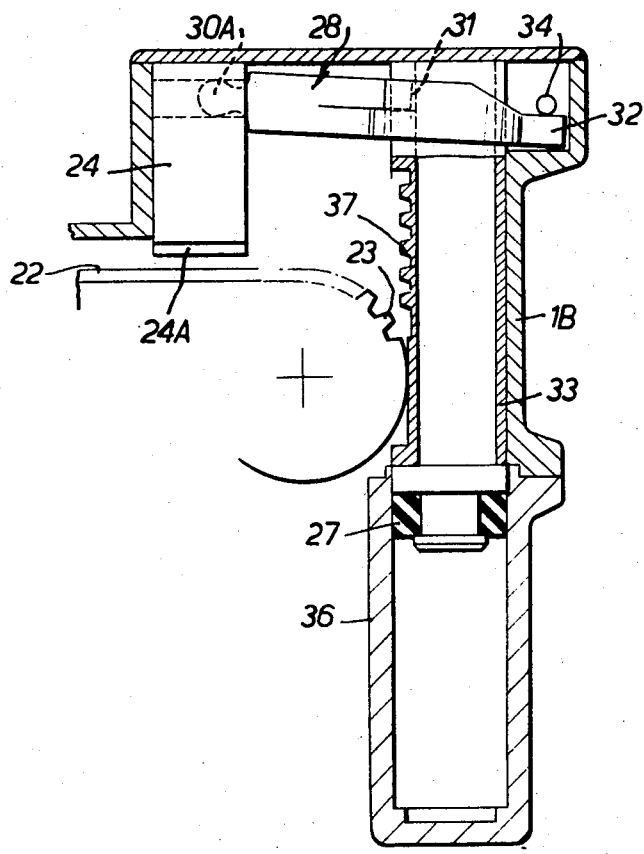
FIG. 4 is a part-sectional elevation on the arrow A in FIG. 2.
Figure 5:
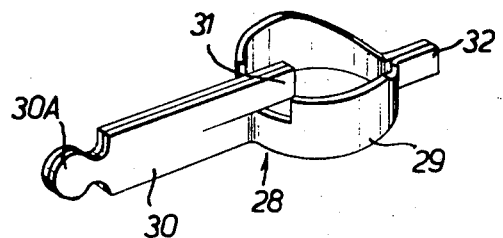
FIG. 5 is a perspective view of a component part.

The lever has the form shown in FIG. 5, being conveniently formed of strip or sheet metal to have a ring portion 29, a long arm 30, a lug 31 projecting into the ring portion 29 and a short arm 32. The outer end of arm 30 has a part circular extremity 30A engaged in a recess in the locking member 24, to have rocking engagement therewith. The ring 29 engages over the piston rod 33 of piston 27, the lug 31 engaging a step on the rod 33, and the short arm 32 engages under a pin 34 fixed in the cylinder body part 1B. The piston 27 works in an auxiliary cylinder 36 at right angles to and offset from the axis of the slave cylinder, and is fast with the cylinder portion 1B. It has its own supply port (not shown) for pressure fluid. The piston rod 33 is hollow to receive a compression return spring (not shown) which urges the piston 27 inwardly in its cylinder 36. Externally, the piston rod is formed with a row of rack teeth 37 for co-operation with the pinion teeth 23 of member 20. However, in the position shown in FIG. 4, a plain, flat portion of the piston rod engages a flat on the member 20 to prevent rotation of the member 20.

In FIG. 1, the slave cylinder is shown in a fully expanded condition, that is with both chambers 4 and 5 under pressure and the brake shoes applied to the brake drum. FIG. 4 shows the auxiliary piston in its fully extended position, the cylinder 36 being pressurized as it normally is when the engine of the vehicle is running. In this position, the lever 28 holds the locking member or plunger 24 in a retracted position, clear of the helical thread 22.

The driver has manual control of a valve controlling the supply of pressure fluid to auxiliary cylinder 36, and when the vehicle is to be parked, the driver holds the foot brake applied while releasing pressure from cylinder 36. The piston 27 is then moved inwardly of its cylinder by the return spring, permitting the lever 28 to rock in an anti-clockwise direction about pin 34 and the plunger 24 is moved inwardly by its spring 26 into locking engagement with the helical thread 22 of the member 20.

After a short initial inward movement, the rack teeth 37 engage the pinion teeth of member 20 to rotate the latter member. Should the partial threads on the plunger initially engage the crests of the helical thread 22, rotation of the member 20 will ensure that the plunger engages the thread space, thereby establishing a screw threaded connection between the plunger and the member 20. Further travel of the piston 27 and rack 37 causes the member 20 to rotate further while reacting against the plunger, so that the member 20 is moved outwardly (to the right as viewed in FIG. 1) to take up any axial clearance between the member 20 and the washer 12.

The driver can now release the foot brake, and the thrust transmitted back through the brake shoes is taken by the slave cylinder acting as a strut. More specifically, this thrust is transmitted through fork end 8, cylinder body 1, plunger 24, member 20, washer 12, spring washers 13 and shackle 14. The load transmitted is limited by that transmitted by the stack of spring washers, which thus act as a resilient load limiting means.

To release this mechanical locking of the brake, the auxiliary cylinder 36 is pressurized, restoring the parts to the positions shown in FIG. 4 and thereby releasing the member 20, spring washers 13 and shackle 14 for return, inward movement under the action of the brake shoe return springs. As the friction at the engaging faces of the helical thread 22 and the plunger 24 are too high for the auxiliary chamber pressure to effect disengagement, the foot brake is also operated to force the piston 2 outwardly to relieve the member 20 of load.

I claim:

1. In or for an internal shoe drum brake having a pair of opposed brake shoes and a brake drum, a fluid pressure slave cylinder for applying said shoes to the drum, the slave cylinder including a cylinder body and mechanical locking means for holding the shoe applied to the drum, wherein said mechanical locking means comprises a rotatable strut member having a helical thread formation thereon and mounted for axial movement relative to said cylinder body, a locking member mounted in said cylinder body for movement towards and away from engagement with said strut member and having a partial screw thread formation for interlocking engagement with said helical thread formation, a mechanical linkage and an auxiliary fluid pressure motor actuating said linkage for controlling engagement and disengagement of said locking member with said strut member, said linkage being further adapted to effect partial rotation of said strut member to facilitate registration of said locking member with said helical thread formation when said locking member is moved into engagement therewith.

2. A slave cylinder according to claim 1, wherein said locking member is spring biassed into locking engagement with said strut member and adapted to be disengaged therefrom by actuation of said auxiliary fluid motor.

3. A slave cylinder according to claim 1, wherein said mechanical linkage includes a reciprocating plunger having a row of rack teeth, and the periphery of said strut member has a circumferential row of pinion teeth engageable thereby, whereby movement of said plunger to effect engagement of said locking member also effects partial rotation of said strut member.

4. A slave cylinder according to claim 1, wherein said mechanical linkage includes a plunger having its line of action at right angles to and offset from the axis of said cylindrical strut member, and a lever engaged by said plunger and rockable thereby, said lever acting on said locking member to effect movement thereof in a radial direction relative to said strut member.

5. A slave cylinder according to claim 1, including connecting means for connection to a brake shoe and wherein said strut member and an actuating piston of said slave cylinder are each in thrust transmitting relation with the said connecting means through the intermediary of a resilient load limiting means.

6. A slave cylinder in accordance with claim 5, wherein said resilient load limiting means comprises a stack of spring washers housed within said strut member, which is arranged co-axially with respect to the line of action of said actuating piston of the slave cylinder.

* * * * *

UNITED STATES PATENT OFFICE
CERTIFICATE OF CORRECTION

Patent No. 3,682,281            Dated August 8, 1972

Inventor(s)     Charles Newstead

It is certified that error appears in the above-identified patent and that said Letters Patent are hereby corrected as shown below:

On the cover sheet, insert -- [73] Assignee Girling Limited, Birmingham, England, a corporation of Great Britain --.

Signed and sealed this 27th day of February 1973.

(SEAL)
Attest:

EDWARD M. FLETCHER, JR.             ROBERT GOTTSCHALK
Attesting Officer                     Commissioner of Patents